UNITED STATES PATENT OFFICE.

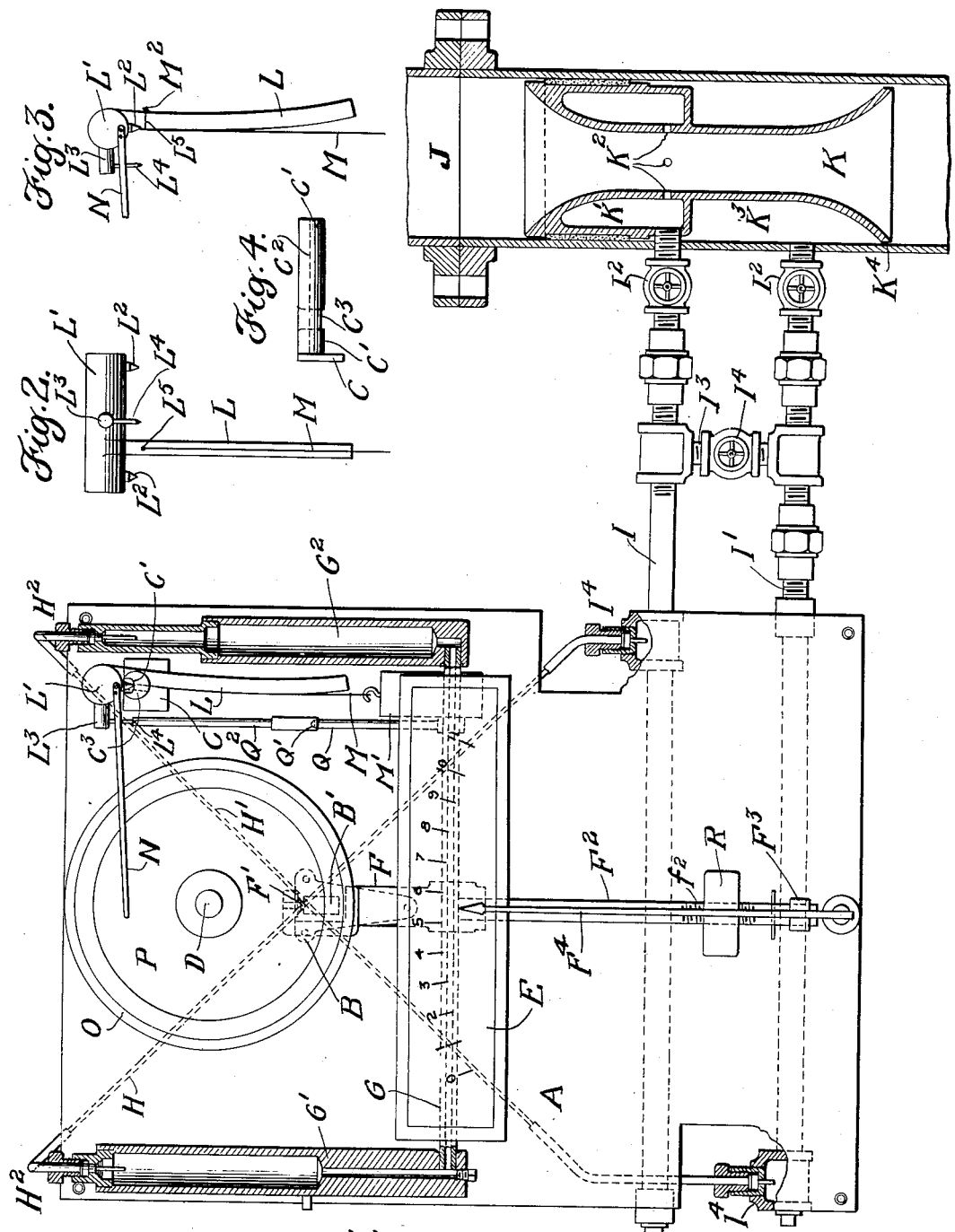

WILLIAM J. CROWELL, JR., OF WYNCOTE, PENNSYLVANIA.

FLOW-METER.

1,366,522.     Specification of Letters Patent.     Patented Jan. 25, 1921.

Application filed March 14, 1919. Serial No. 282,635.

*To all whom it may concern:*

Be it known that I, WILLIAM J. CROWELL, Jr., a citizen of the United States, and a resident of Wyncote, county of Montgomery, State of Pennsylvania, have invented certain new and useful Improvements in Flow-Meters, of which the following is a true and exact description, reference being had to the accompanying drawings.

My invention relates to flow meters of the pivoted U tube type in which differential pressure as a function of the flow to be measured is transmitted to the arms of the U, thereby creating a tilting movement approximately proportional to the transmitted differential pressure.

In such apparatus the moment resisting tilting of the pivoted U is normally approximately proportional to the magnitude of the angle of tilt, with the result that the angle of tilt, that is the angle of deflection, is normally approximately proportional to the differential pressure causing that tilt.

Usually it would be advantageous to have the tilt of the pivoted U proportional to the flow that creates the differential pressure instead of to the differential pressure.

The object of my invention is to provide means whereby the tilt of the pivoted U will be proportional to flow instead of to differential pressure, and I accomplish the desired object by making the moment resisting deflection of the pivoted U bear such predetermined relation to angular deflection as will make this angular deflection proportional to flow instead of to differential pressure.

When deflected by reason of differential pressure the tilting and resisting moments upon a pivoted U exactly balance one another and may be equated. Expressed algebraically $KH = K_{,}fx$ or $$fx = \frac{K}{K_{,}H}.$$

In the ordinary pivoted U the resisting moment varies directly with $x$ (that is $fx = x$), and therefore varies with H or $Q^2$. If $fx$ is made $x^2$ so that $KH = K_{,}x^2$ then $x$ will vary directly with $H^{1/2}$, and, therefore, with flow if the source of differential pressure is a Venturi tube or similar device. In the above K and $K_{,}$ are constants, $f$ stands for function, $x$ is angular deflection, H is differential pressure and Q is rate of flow.

My invention comprises means for obtaining "rectified" motion of the pivoted U, that is of obtaining deflection proportional to flow. Where the flow varies with $H^{1/2}$ my invention makes the moment resisting H vary with $x^2$ and $x$ therefore vary with $H^{1/2}$ or with Q, and in general where the flow is known to vary with $H^n$ the resisting moment on the pivoted U is made to vary with $X^{1/n}$. Generally speaking my invention consists of a weighted pivoted cam arranged to oppose deflection of the pivoted U to an extent that varies in accord with such predetermined function of the angle of deflection as will, with a neutral pivoted U, give deflection proportional to flow instead of to differential pressure. A "neutral" pivoted U is one that has no tendency to stand in any particular position within the range of its deflection except in so far as such tendency is obtained from the pivoted cam.

The pivoted cam, deflected whenever the pivoted U is deflected, tends to return to its zero position by reason of a turning moment exerted upon it by a suspended weight and this turning moment upon the pivoted cam, resisting deflection of the cam, and, therefore, of the pivoted U, is made to vary in accord with such predetermined function of $x$ as will make the deflection of the pivoted U vary in direct proportion to flow. The turning moment upon the pivoted cam by the suspended weight is equal to that weight multiplied by its arm upon the cam pivot and the curve of the cam is made such that this arm will vary in accord with the proper predetermined function of the angle of deflection. When Q varies with $H^{1/2}$ the cam will have such a curve that the moment arm of the suspended weight will vary with $x^2$.

Reference being now had to the drawings which illustrate my invention—

Figure 1 is a partly sectional front elevation showing my improved flow meter and its connection with a conduit the flow in which is to be measured.

Fig. 2 is a side view of the rectifying cam and its immediate connections.

Fig. 3 is a front elevation of the rectifying cam and its connections, and

Fig. 4 is a side view of the cam supporting bracket shown in end view in Fig. 1.

A is the base plate of the meter in which is secured a bracket B, having an arm B' on which is pivotally supported the tilting U tube. C indicates another bracket supporting an arm C', formed, as shown, with a groove C² at its top in which rest the pivot points of the cam, to be described. The arm C' is slotted at C³ to give clearance to the cam. Also supported on plate A is the spindle D actuated by any convenient mechanism (not shown) and supporting a diagram plate O, P indicating the diagram. Also supported on base A is the scale E.

F is a depending block pivotally supported on arm B by knife edges F', and from which extends the rod F² threaded at f², which, through mechanism generally indicated at F³, actuates an index finger F⁴. This mechanism forms no part of my invention and is not, therefore, shown in detail. R is a counterweight adjustable on rod F² as by screwing on its threaded portion. G is the horizontal or bottom tubular portion of a U tube structure secured to the depending pivoted block F, and G' and G² are the upwardly extending arms of the U. H and H' are flexible tubes through which differential pressures are communicated to the legs of the U tube, as shown, the tubes being secured to the tops of the U, as shown at H², H², and preferably they are made of small bore metal tubing having straight portions crossing each other at or very near the pivotal axis about which the U tube oscillates. The lower ends of the tubes are connected as indicated at I⁴, I⁴, with pipes I and I' connected, as shown, with the chambers K' and K³ of a Venturi tube situated in a conduit J, the rate of flow in which is to be measured. K² indicates perforations in the neck of tube K leading into chamber K'. I², I² indicate valves in pipes I and I', and I³ a by-pass pipe provided with a by-pass valve I⁴. By the Venturi tube device shown, or by means of any other device for bringing about a differential pressure as a function of a rate of flow, differential pressures are provided in the legs of the U tube and the U tube gage caused to tilt on its pivot to a degree proportional to that function of the differential that is proportional to the rate of flow, and, therefore, proportional to the rate of flow. The construction and mode of operation of such apparatus is well known and no detailed description is therefore necessary.

For the best results in my new construction the combination of the pivoted U and pivoted cam is set neutral, that is balanced so that with zero differential and zero weight on the cam, to be described, it will, within the limits of its range, have no tendency toward any one position.

L is my pivoted cam, the downwardly extending arm of which is curved as described above, so that as it is turned on its pivot the arm through which the suspended weight tends to oppose its turning movement will vary with the proper predetermined function of the angle of deflection. The cam arm L curves down from a balancing and pivot-point supporting head L', the pivot points L², L², bearing in the groove C² of the arm C', the cam curve having its zero in its pivotal axes. M is a cord secured at the zero point on the face of cam L, as shown, by passing through a perforation L⁵ in the cam arm, M² indicating a knot securing it in place. The zero point from which the cord depends should lie in the pivotal axis of the cam. M' is the weight supported by cord M. C³ is a slot formed in arm C' to give clearance to the cam L. The cam L is connected to the U tube by means of an arm L³ and pin L⁴ contacting through a rod or link Q² with a point Q' of an arm Q, secured to and extending up from the U tube. N indicates a pen holding arm secured to the head L' of the cam L and extending over the diagram P.

In operation flow through the venturi impresses a tilting moment on the pivoted U proportional to the differential pressure created by the flow. This tilting moment, due to flow and proportional to impressed differential pressure, tilts the pivoted U until the tilting moment is exactly balanced by an equal and opposite restoring moment from the pivoted cam, through the arm L³, link Q² and arm Q. This restoring moment or resistance to deflection is made to bear such a relation to the angle of deflection that this angle of deflection will keep proportional to flow through the venturi, there being a known relation between flow through the venturi and differential pressure impressed upon the pivoted U.

The combination of pivoted U and pivoted cam is neutral to deflection except in so far as acted upon by the weight M' hanging from the cord M. While the combination of pivoted U and pivoted cam is neutral to deflection yet it is convenient to have the cam and pivoted U react slightly upon one another so as to keep them in phase with one another all the way to zero despite any pen friction. While pen friction is extremely small the restoring moment from the weight on the cam becomes infinitely small at the cam zero.

To explain in more detail what I mean in referring to the neutral setting of the gage and of the combined gage and cam, a pivoted U is neutral when within the limits of its range it has, with zero differential, no material tendency toward any one position. If freed from the action of the flexible connections and of the cam neutrality would involve adjustment such that the center of gravity of the pivoted U is vertically beneath its pivot whenever the surface of the mercury in the two cylinders is of the same level. Let the center of gravity of the pivoted U balance be initially vertically beneath the pivot a distance L and X be an angle of deflection. The deflection momentarily shifts the center of gravity out from beneath the pivot a distance L sin X and the transfer of mercury from one cylinder to the other, by reason of the mercury coming to the same level in the two cylinders, shifts the center of gravity back a distance K sin X, K being practically a constant, a function of the dimensions and weight of the pivoted U. Deflection momentarily shifts the center of gravity out a distance L sin X and the transfer of mercury resulting from deflection brings the center of gravity back a distance K sin X. If L is adjusted so that it equals K the final horizontal position of the center of gravity does not change by reason of deflection and the balance, if free from any action of the flexible connections and cam, is neutral. In practice the flexible connections and cam (with zero weight on the cam) both exert a slight turning effect upon the balance practically proportional to sin X and equal to K′ sin X, K′ being a very small constant. After deflection, the mercury having come to level, the turning moment upon the balance is [W(L−K)+K′] sin X, where W is the total weight of the pivoted U, and L is adjusted to equal $K - \frac{K}{W}$, so that W(L−K̄)+K′=0, after which the balance is neutral, that is, within the limits of its range, with zero differential, has no material tendency toward any one position, except by reason of the weight upon the cam.

The cord M, supporting the weight M′, hangs vertically tangent to the curve of the cam. The arm of the weight M′ is the horizontal distance between the vertical cord and a vertical through the pivotal axis of the cam. With zero deflection the arm of the weight M′ is zero, the weight M′ hanging directly beneath the pivotal axis. As the pivoted U deflects in response to flow through the venturi there is an upward motion of the right hand side of the U tube, which, acting through arm Q, link $Q^2$ and arm $L^3$ on the cam L rotates the cam to the left, the point of vertical tangency which is the point of free suspension for the cord M moves down the cam curve and horizontally to the left of the pivotal axis a distance depending upon the predetermined curve of the cam, which is calculated and so formed that the horizontal distance between the vertical cord M supporting the weight M′, and a vertical through the pivotal axis of the cam bears such a relation to cam deflection that this cam deflection keeps proportional to flow through the venturi. Obviously the movement of the pen holder N over the diagram will correspond also with the actual rate of flow.

It is a material advantage for the pivoted U and the pivoted cam to be balanced neutral with respect to deflection, except so far as acted upon by the weight M′, inasmuch as when thus neutral the range of the meter may be widely varied by merely varying the weight M′, but the applicant fully understands that this condition of neutrality with respect to deflection, except as acted upon by weight M′, is not essential for correct operation at a single range and claims the invention irrespective of this advantageous feature of neutrality.

Having now described my invention, what I claim as new and desire to secure by Letters Patent, is:

1. In a flow meter a pivoted U tube, subject to deflection by means of differential pressure incident to flow, means for resisting deflection of said pivoted U tube consisting of a balanced cam pivoted on a center other than the pivot of the U tube, a weight supporting cord hanging vertically tangent to the curve of the cam and secured to the cam, and means for connecting the pivoted U tube and the cam so that the cam is deflected or tilted on its pivot in definite relation to the deflection or tilting of the pivoted U tube.

2. In a flow meter a pivoted U tube, subject to deflection by means of differential pressure, incident to flow, means for resisting deflection of said pivoted U tube consisting of a balanced pivoted cam, a weight supporting cord hanging vertically tangent to the curve of the cam and secured to the cam, and means for connecting the pivoted U tube and the cam so that the cam is deflected or tilted on its pivot in definite relation to the deflection or tilting of the pivoted U tube, the combination of the pivoted U tube and pivoted cam being set neutral to deflection apart from the action upon them of the weight depending from the cam.

WILLIAM J. CROWELL, Jr.